Sept. 4, 1928.
G. T. FOSTER
1,683,455
LOCOMOTIVE STRUCTURE
Filed Dec. 31, 1926
4 Sheets-Sheet 1
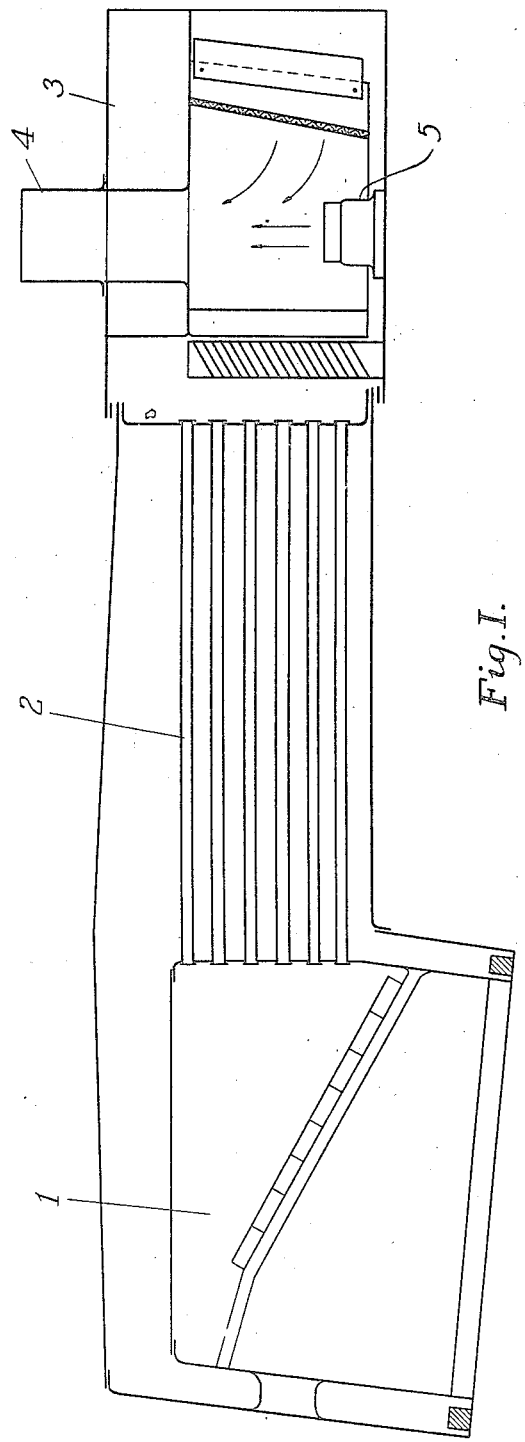
Fig. I.
INVENTOR
Guy T. Foster
By Christy and Christy
his attorneys Sept. 4, 1928.
G. T. FOSTER
1,683,455
LOCOMOTIVE STRUCTURE
Filed Dec. 31, 1926
4 Sheets-Sheet 2
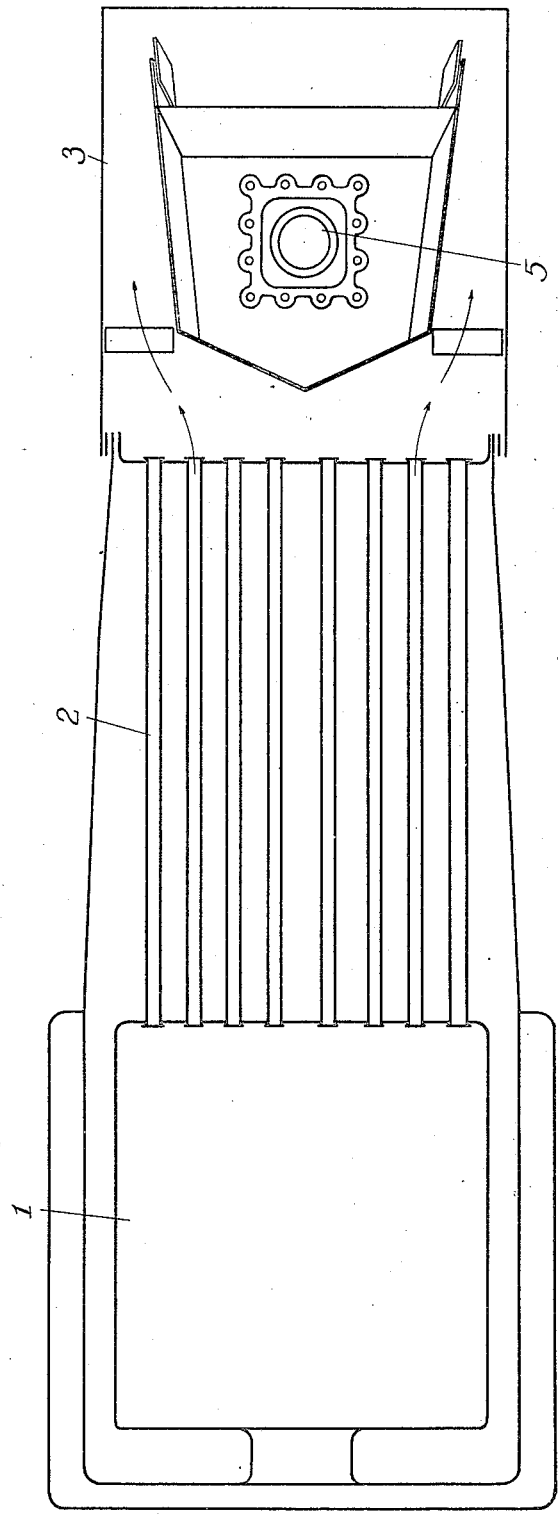
Fig. II.
INVENTOR
Guy T. Foster
by Christy and Christy
his attorneys Sept. 4, 1928.
G. T. FOSTER
1,683,455
LOCOMOTIVE STRUCTURE
Filed Dec. 31, 1926    4 Sheets-Sheet 3
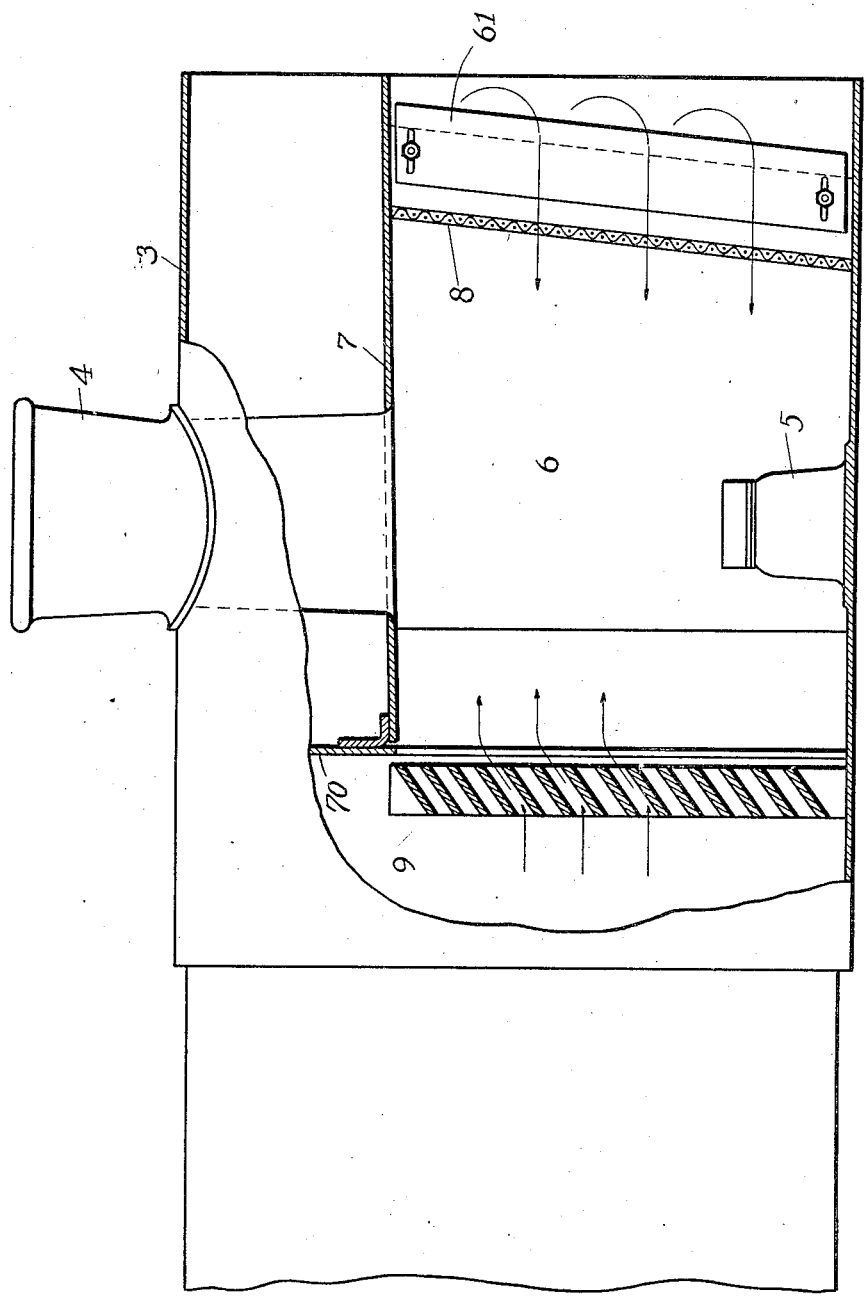
Fig. III.
INVENTOR
Guy T. Foster
by Christy and Christy
his attorneys Sept. 4, 1928.  G. T. FOSTER  1,683,455
LOCOMOTIVE STRUCTURE
Filed Dec. 31, 1926  4 Sheets-Sheet 4
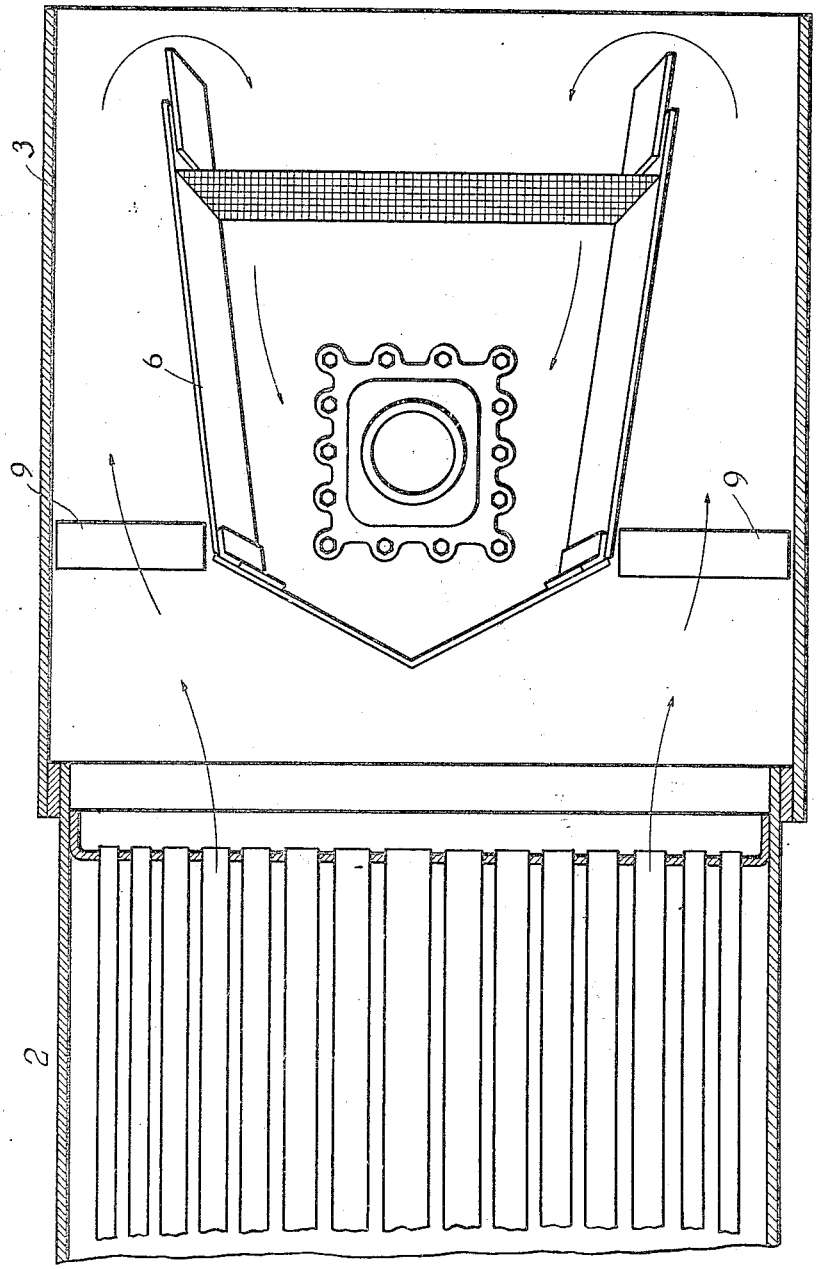
Fig.IV.
INVENTOR
Guy T. Foster
By Christy and Christy
his attorneys Patented Sept. 4, 1928.

1,683,455

UNITED STATES PATENT OFFICE.

GUY T. FOSTER, OF DAYTON, OHIO, ASSIGNOR TO LEROY THOMPSON, OF NEW YORK, N. Y.

LOCOMOTIVE STRUCTURE.

Application filed December 31, 1926. Serial No. 158,205.

In Letters Patent of the United States No. 1,595,932, granted me August 10, 1926, I have described and claimed a feed-water heater for a locomotive engine. The feed-water heater is arranged in the smoke-box of the locomotive and the arrangement is such as to afford a heat exchange of relatively great magnitude, from the out-flowing stream of smoke and hot gases to the inflowing stream of water.

I have found in the practice of my invention that the arrangement of passageways in the smoke-box, disclosed in the said Letters Patent, is such that the conditions of draft through the bed of fuel in the fire-box of the locomotive are notably improved that instead of being concentrated toward the center of the bed of fuel, the intensity of the draft is spread and equalized, both transversely of and longitudinally of the fuel bed; and that furthermore an adjustment present in the arrangement of partitions disclosed in the said Letters Patent makes possible an adjustment in the distribution of and equalization of conditions of draft longitudinally of the fuel bed. This condition and this improvement which I have effected relates itself particularly to and reveals itself to greatest advantage in connection with the fire box of present day type which is relatively wide: wider than that of earlier type and wider than the bank of boiler flues. Such distribution of draft through the fuel bed has value, independently of the feed-water heater; the arrangement of passageways worked out primarily for water heating purposes has value to improve combustion and to economize fuel, and these advantages may be enjoyed and will afford improvement in locomotive operation such as to justify their presence, even though the water heater, for which the arrangement of passageways was primarily designed, be omitted from the structure. Accordingly, my present invention consists in an improvement in the arrangement of passageways within the smoke-box of a locomotive. That arrangement of passageways is found in the structure shown and described in the Letters Patent mentioned; it is found also in the structure illustrated in the accompanying drawings, and which does not include a feed-water heater.

I have additionally discovered that, by adopting this arrangement of passageways within the smoke-box, not only do I improve draft conditions in the fuel bed and so improve combustion and economize fuel, I am able additionally to reduce the height of the exhaust nozzle stand and to increase the size of the nozzle opening, through which spent steam from the engine cylinder is jetted toward the smoke-stack, without loss in efficiency, and in consequence back pressure upon the piston within the engine cylinder is diminished and the efficiency of the engine is correspondingly increased.

In the accompanying drawings Fig. I is a diagrammatic view in longitudinal section of a locomotive boiler in which my invention is embodied; Fig. II is a view of the same structure in medial horizontal section; Fig. III is a view to larger scale showing in side elevation the forward end of the boiler and in vertical and medial section the smoke-box; and Fig. IV is a view in horizontal and medial section of the smoke-box and of the adjacent forward end of the boiler itself.

Referring first to Figs. I and II the structure shown includes a fire-box 1, a bank of boiler flues 2, and a smoke-box 3. A smoke-stack 4 opens from the upper part of the smoke-box, and below and in vertical axial alignment the injection nozzle 5 is arranged. Exhaust steam from the engine cylinder jetted through nozzle 5 accelerates flow of the gases through the smoke-stack 4. The flow of hot gases is longitudinally forward from the fire-box to the smoke-box, and thence upward and out through the smoke-stack.

Inasmuch as the structure described affords, with minor modifications, an essentially cylindrical conduit through which the gases are caused to flow, the stream meets with resistance which (but for my invention) is peripherally relatively great and centrally relatively small, and in consequence there is within the fire-box an unequal distribution of draft. The draft is most effective toward the center of the fuel bed and is less effective toward the periphery. This inequality of draft brings it about that combustion is not and cannot be perfect, and accordingly there is a failure to attain the best efficiency from the fuel. My improvement effects a spreading of the draft from the center of the fuel bed outwardly and an equalization which results in more complete combustion and higher efficiency.

Referring particularly to Figs. III and IV, I provide a bifurcated partition 6, arranged in the smoke-box. It is symmetrically placed, as best shown in Fig. IV. At its mid-point it stands to rearward of the vertical axis in which smoke-stack and injection nozzle are aligned, and its bifurcations extend forwardly on opposite sides of that vertical axis, toward the front wall of the smoke-box. They do not however extend to that forward wall, there is passageway between. The smoke-box is provided with a horizontally extending partition wall 7, cutting off the upper portion of the cylindrical room within the smoke-box. This horizontal partition wall 7 extends, as best shown in Fig. III, from the lower edge of a depending screen wall 70 situated at the rear of the smoke-box to the front wall of the smoke-box. The two walls 7 and 70 close off an idle space and the passageways for the products of combustion are arranged beneath that partition wall. The smoke-stack rises through this partition 7 and its lower rim is preferably flush with the lower surface of partition 7.

The bifurcated partition 6 divides the space beneath the partition wall 7 and defines a passageway for the products of combustion which in Figs. III and IV is indicated by arrows. The stream of the products of combustion emerging from the boiler flues 2 is by the partition 6 divided into a bifurcated stream whose branches flow forwardly and in horizontally separated positions symmetrically within and adjacent the side walls of the smoke-box. These stream branches as they approach the front wall of the smoke-box turn inward and meet and then turn and flow rearwardly between the branches of partition 6 and centrally in the smoke-box, toward the vertical axis on which smoke-stack 4 and injection nozzle 5 are aligned. The gases are caught up in the line of flow so defined, and escape through the smoke-stack. The draft accelerated by the jet of steam through nozzle 5 accelerates flow of the hot gases and so aids in the establishment of conditions of combustion and of heat transference, in the usual manner.

The rearwardly directed end of partition 6 may be particularly shaped as preferred. As seen in Fig. IV, I have shown it to be angled and prow-shaped, and I have found that particular shape to be good.

The breadth of the structure 6, that is to say the space between its opposite branches is suited to the diameter of the smoke-box, so as to afford properly proportioned passageways both for the divided branches of the stream and then for the reunited and rearwardly flowing stream. The forward flare of these opposite branches of partition 6, shown particularly in Fig. IV, I have found to be good. It will be noted further that the space at which the forward edges of partition 6 stand away from the front wall of the smoke-box is narrow. By thus dividing the stream and carrying its branches laterally I spread the draft conditions and cause the draft through the fuel bed in the fire-box to be spread and equalized, from the middle of the bed outwardly.

The branches of partition 6 are at their forward edge inclined to the vertical, as best seen in Fig. III, and in consequence the width of the passageway is greater toward the bottom. This feature, together with the partition wall 7, tends to shift and spread the intensity of the draft longitudinally of the fuel bed in the fire-box. The forward ends of the branches are adjustable longitudinally, as by means of movable terminal extensions 61, and by this provision the passageway around the ends of the partition may be varied in width, and thus the draft through the fuel bed may be adjusted longitudinally.

Between the branches of partition 6 and at the anterior end of the passageway for the flow of the united stream rearwardly, I place a cinder screen 8. It is shown in Fig. III to be inclined somewhat. The stream will at this point have a slight upward trend, and the screen will stand perpendicular to the line of flow. The screen may have the pivotal structure described in my application for Letters Patent of the United States, filed July 9, 1926, Serial No. 121,326.

In the rear, and conveniently where the bifurcated stream enters the lateral passageways, louvers 9 may be set. The cinders borne by the stream impinging on these louvers will to a very appreciable and very considerable degree be broken up, and consequently there will be less retardation of cinders upon screen 8.

Attention has already been directed to the fact that the two branches of partition 6 spread outwardly in their rear-to-front extension and that at their forward edges they are remote at a narrow space from the front wall of the smoke-box. Bearing in mind the fact that draft through the smoke-stack induces flow, it will be perceived that the narrowing of the lateral passageways to the point where they turn and meet causes the cinders borne in the stream to be projected with greater velocity toward the screen 8. Large cinders so striking the screen are because of increased velocity more effectively broken up; their fragments are carried on, and the screen itself is kept freer of clogging. This provision accordingly, cumulatively with the louvers 9, aids in the disposal of cinders.

The change in the arrangement of the passageways, the presence of partition 7, and the widening downwardly of the passageways around the forward edges of partition 6 cooperate to shift downwardly the stream of gases. These provisions accordingly result in avoidance of the necessity which hitherto has existed of directing a portion of the stream forwardly along the very bottom of the smoke-box. My structure dispenses therefore with a horizontal partition toward the bottom of the smoke-box. The steam injection nozzle stand accordingly need not be prolonged upwardly to penetrate such partition. I am therefore able to provide a relatively low nozzle. I am further able to provide a nozzle of relatively large orifice. In consequence there will be less back pressure on the piston in the engine cylinder and correspondingly greater engine efficiency.

I claim as my invention:

1. In a locomotive boiler structure including fire-box, boiler flues, and a cylindrical, horizontally extending smoke-box, and smoke-stack and injection nozzle arranged in vertical axial alignment in the top and bottom of the smoke-box, a horizontally extending partition arranged within the smoke-box and extending longitudinally from the rear to the front wall of the smoke-box and closing off an upper idle space within the cylindrical outer wall of the smoke-box and a bifurcated vertically extending partition arranged within the smoke-box and beneath the said horizontally extending partition and extending from the rear and on opposite sides of the axis upon which smoke-stack and injection nozzle are aligned, and affording passageways for the gases forwardly from the boiler flues in bifurcated course adjacent the side walls of the smoke-box, and then rearwardly in united course at the center of the smoke-box toward the vertical axis in which smoke-stack and injection nozzle are aligned.

2. The structure of claim 1, the bifurcated vertically extending partition at its forward edges being spaced to rearward of the front wall of the smoke-box at an interval widening from above downwardly.

3. The structure of claim 1, the bifurcated vertically extending partition at its forward edges being spaced to rearward of the front wall of the smoke-box and forming with the front wall of the smoke-box narrowed places in the passageways for the flow of the gases, and a cinder screen arranged in the line of flow adjacent to and beyond such narrowed places.

4. The structure of claim 1, the bifurcated vertically extending partition at its forward edges being spaced to rearward of the front wall of the smoke-box and forming with the front wall of the smoke-box narrowed places in the passageways for the flow of gases, a cinder screen arranged in the line of flow adjacent to and beyond such narrowed places, and a second cinder screen arranged in the line of flow at the rear and intake end of the smoke-box.

5. In a locomotive boiler structure including a fire-box, boiler flues, smoke-box, and smoke-stack, a bifurcated partition extending from the rear on opposite sides of the axis of the smoke-stack, the forward edges of the furcations of the partition being inclined relatively to the front wall of the smoke-box, and the furcations being adjustable in their extension forwardly toward the front wall of the smoke-box.

In testimony whereof I have hereunto set my hand.

GUY T. FOSTER.